No. 684,930. Patented Oct. 22, 1901.
D. HANAUER & T. VEITCH.
MECHANISM FOR MOTOR VEHICLES.
(Application filed Dec. 13, 1900.)
(No Model.) 4 Sheets—Sheet 1.
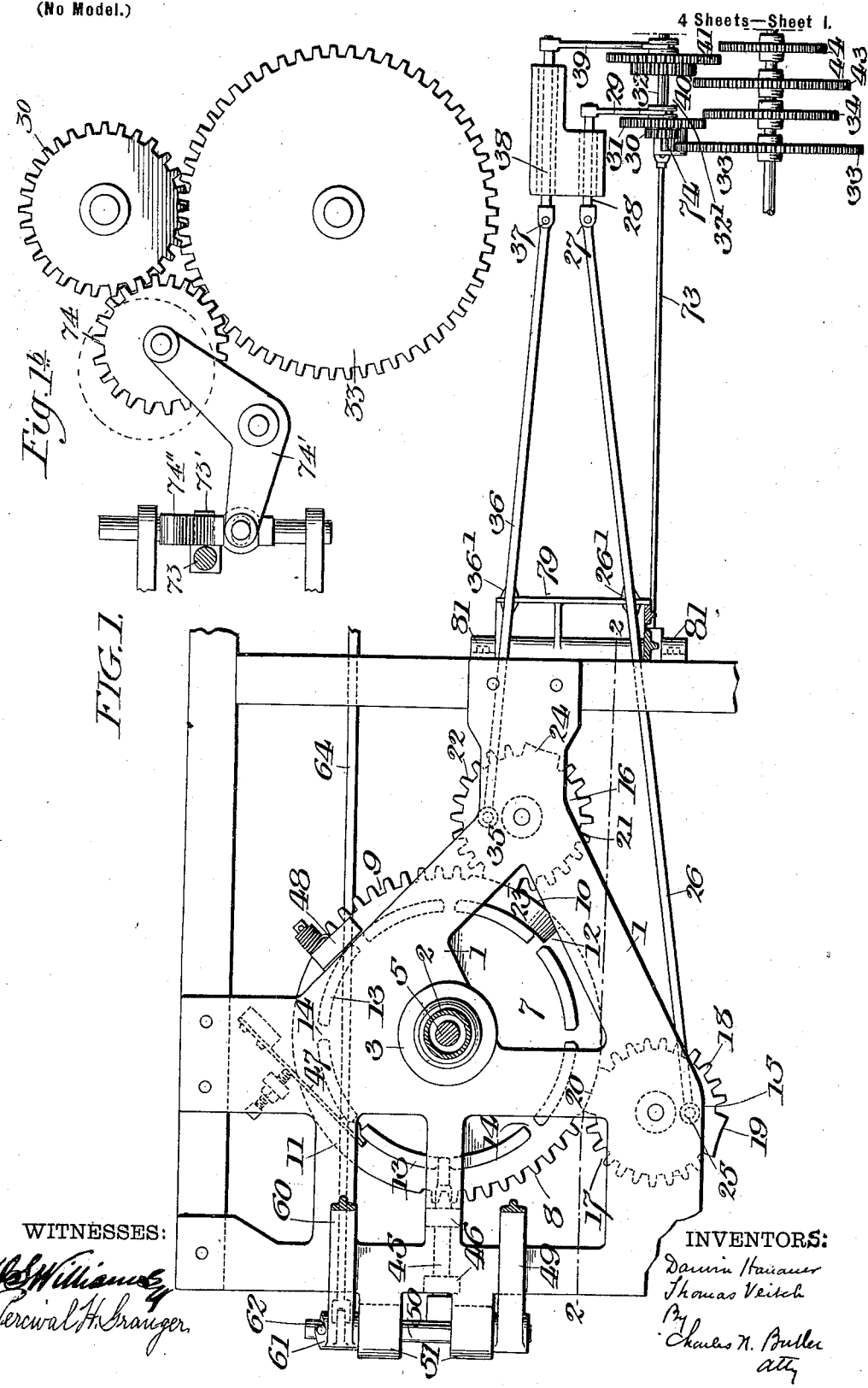
WITNESSES:
INVENTORS:

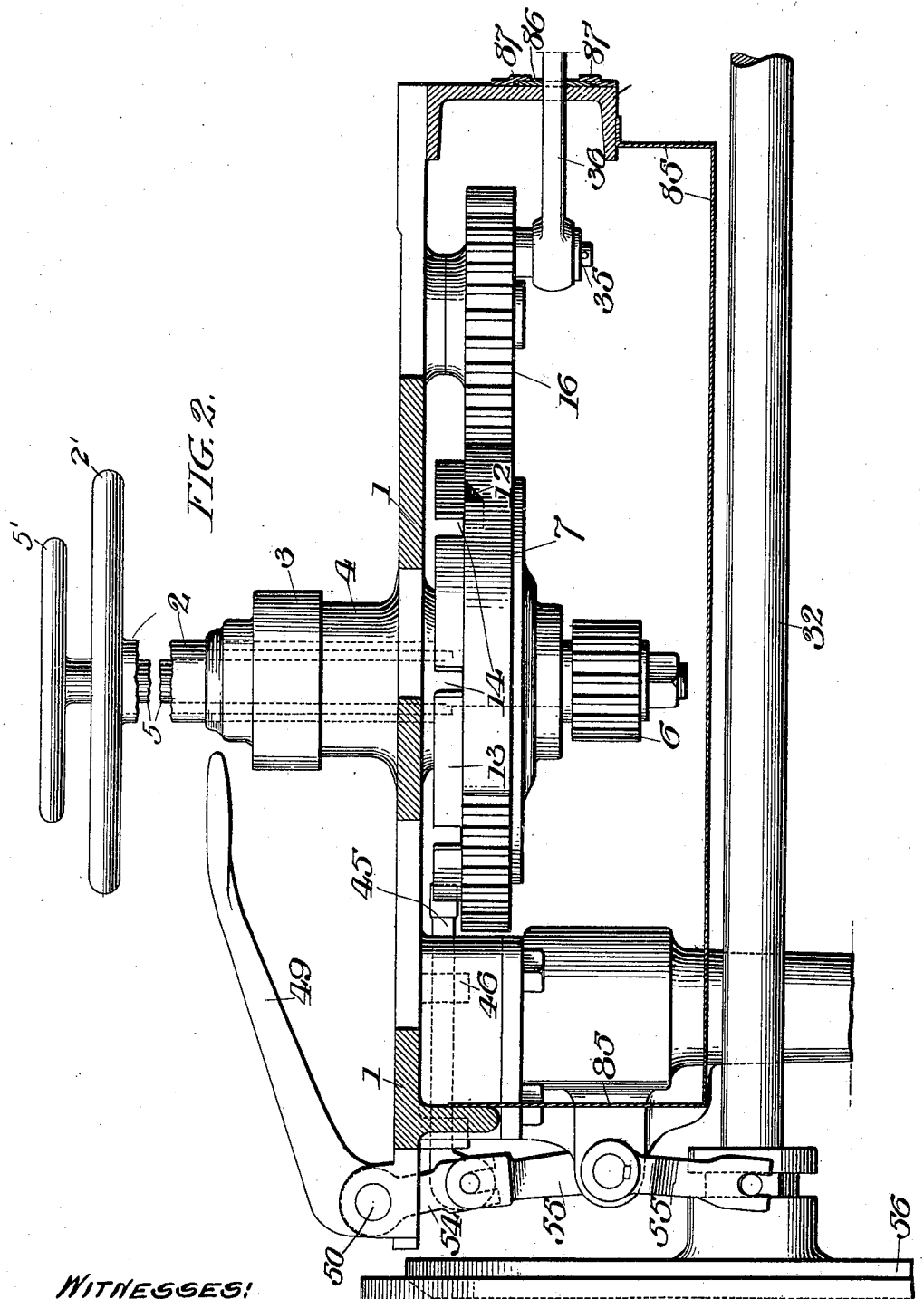

No. 684,930. Patented Oct. 22, 1901.
D. HANAUER & T. VEITCH.
MECHANISM FOR MOTOR VEHICLES.
(Application filed Dec. 13, 1900.)
(No Model.) 4 Sheets—Sheet 3.
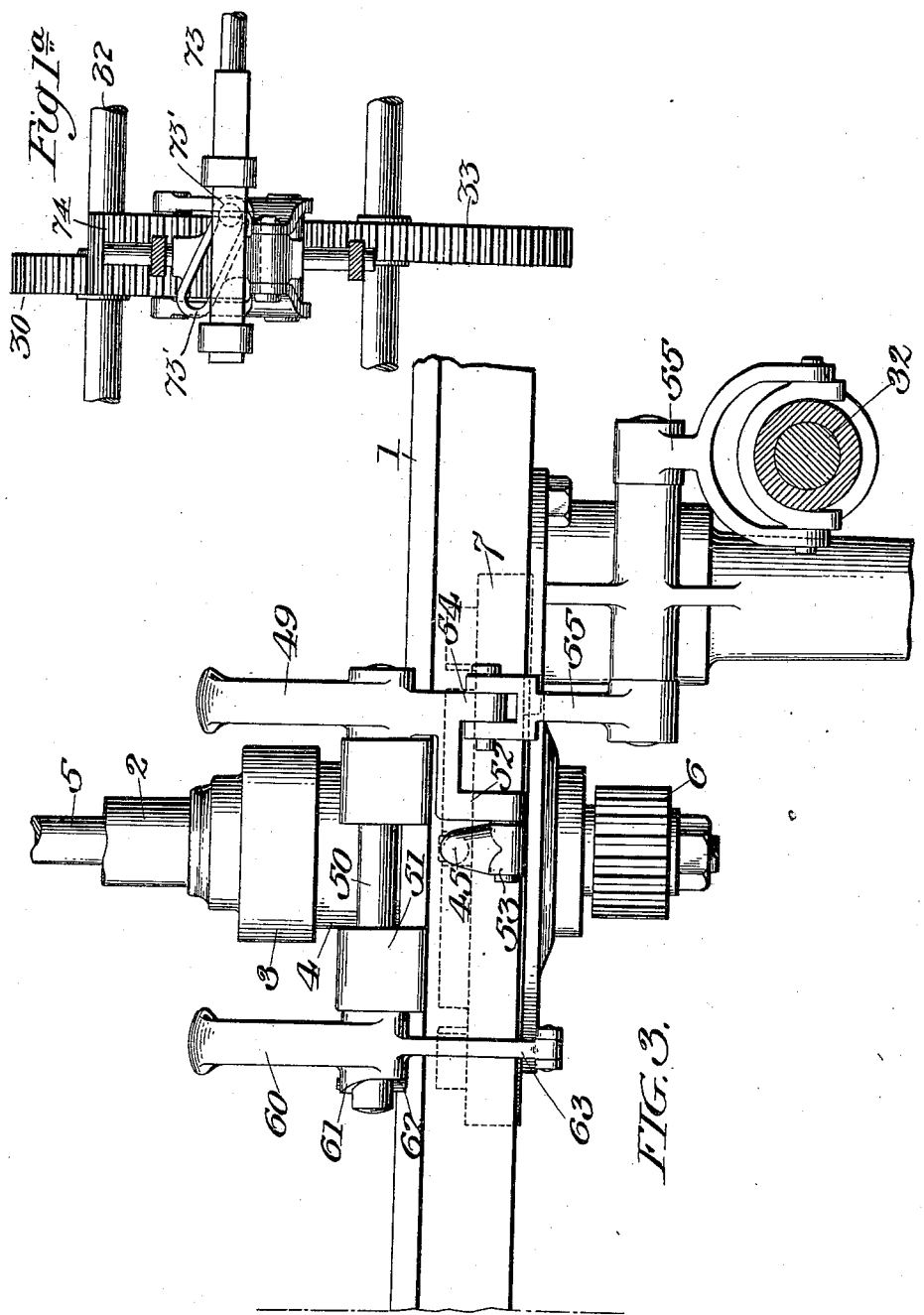

No. 684,930. Patented Oct. 22, 1901.
D. HANAUER & T. VEITCH.
MECHANISM FOR MOTOR VEHICLES.
(Application filed Dec. 13, 1900.)
(No Model.) 4 Sheets—Sheet 4.
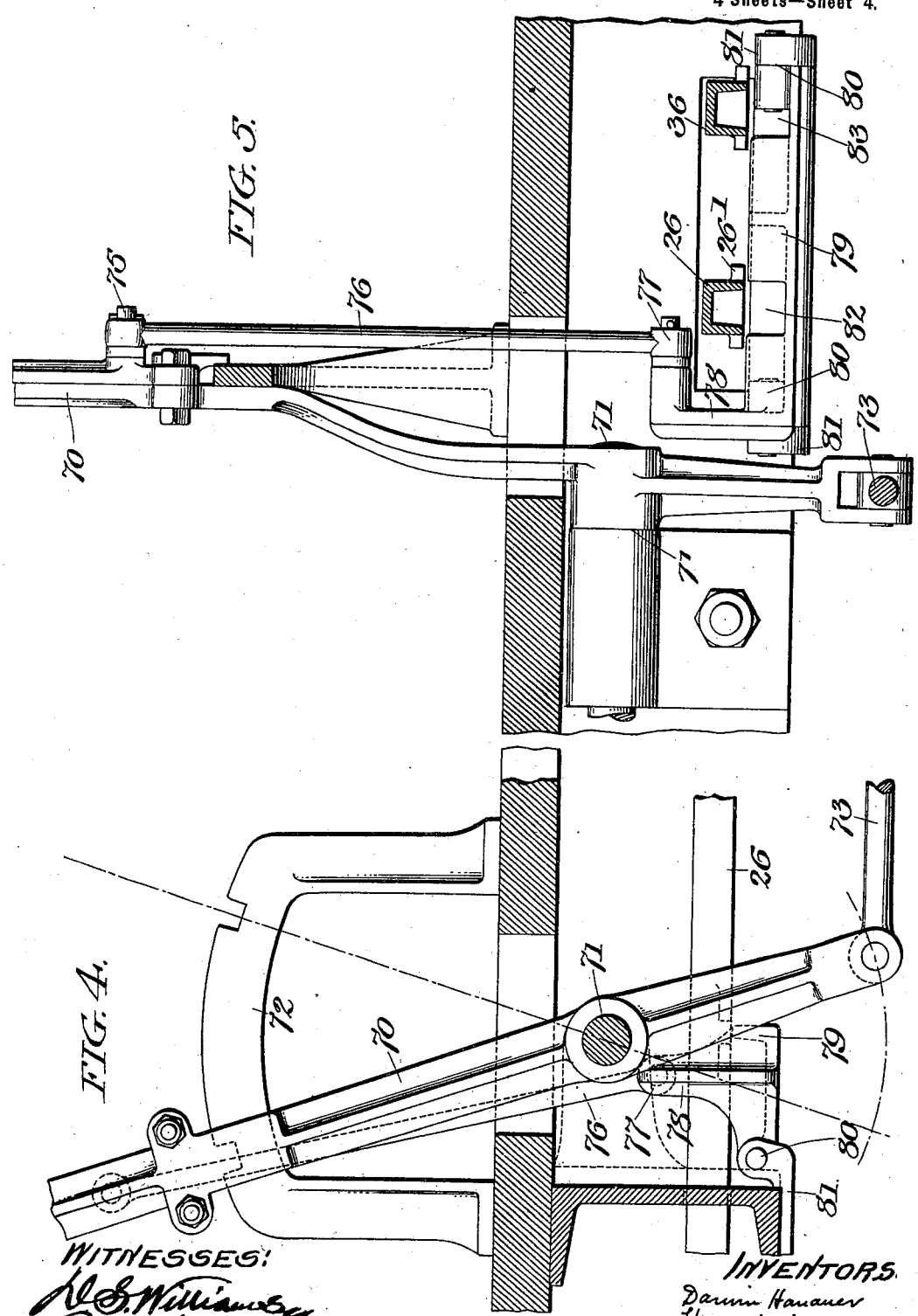

UNITED STATES PATENT OFFICE.

DARWIN HANAUER, OF LONG ISLAND CITY, AND THOMAS VEITCH, OF YONKERS, NEW YORK, ASSIGNORS TO DAIMLER MANUFACTURING COMPANY, OF LONG ISLAND CITY, NEW YORK.

MECHANISM FOR MOTOR-VEHICLES.

SPECIFICATION forming part of Letters Patent No. 684,930, dated October 22, 1901.

Application filed December 13, 1900. Serial No. 39,806. (No model.)

*To all whom it may concern:*

Be it known that we, DARWIN HANAUER, a resident of Long Island City, in the county of Queens, and THOMAS VEITCH, a resident of Yonkers, in the county of Westchester, State of New York, have jointly invented new and useful Improvements in Speed-Controlling Mechanisms for Motor-Vehicles, of which the following is a specification.

This invention relates to interlocking mechanism particularly adapted for controlling the gearings by which different speeds are transmitted from a driving to a driven shaft.

The improvements comprised in the invention are primarily designed for use in motor-vehicles where it is desirable to change the speed of the vehicle independently of the speed of the motor. This variation in speed is obtained by employing on the driving-shaft a plurality of gear-wheels revolved by the shaft, but longitudinally movable thereon, so that they may severally be thrown into engagement with corresponding gear-wheels fixed on a shaft driven thereby, providing different combinations by which different speeds may be obtained. To control these sets of variable-speed gears and to secure the desired position of each set with respect to the others by a simple operation are the leading purposes of the present invention.

The further purposes will fully appear from the following description and the accompanying drawings, relating to the improvements.

Referring to the drawings, Figure 1 is a plan view of mechanism embodying the invention. Fig. 1ª is a bottom view of the reverse mechanism. Fig. 1ᵇ is a front view of the mechanism shown in Fig. 1ª. Fig. 2 is a view in sectional elevation taken on the line 2 2 of Fig. 1. Fig. 3 is a front view of mechanism embodying the improvements. Fig. 4 is a side view of mechanism for securing the disengagement of the advancing gears when the reverse is engaged, and vice versa; and Fig. 5 is a rear view of the mechanism illustrated in Fig. 4.

As shown in the drawings, the frame 1 carries a revoluble shaft 2, operated by the hand-wheel 2′ and provided with a suitable support by fixing thereon a collar 3, adapted to turn on the bearing 4, the shaft 2, being hollow and sleeved on the shaft 5, is revolved by the hand-wheel 5′, for operating the steering-gear 6. Fixed to the shaft 2 is the primary segmental wheel 7, having the gear-segments 8 9 and the blank segments 10 11, as also the catch 12 and the segmental projections 13, with the openings 14 between them.

Journaled in the frame 1 are the secondary segmental wheels 15 and 16. The wheel 15 has the gear-segments 17 18 and the blank segments 19 20, adapted, respectively, to engage with the corresponding gear-segments and blank segments of the primary segmental wheel 7, and the wheel 16 is provided with the gear-segments 21 22 and the blank segments 23 24, which engage, respectively, with the corresponding gear-segments and blank segments of the primary segmental wheel 7.

Connected to the secondary wheel 15 by an eccentric pivot 25 is a rod 26, having a pivotal connection 27 with well-known variable-speed mechanism comprising the longitudinally-movable rod 28, having an arm 29, which moves the gears 30 and 31 along the driving-shaft 32, so that the gear 30 may engage the gear 33 to produce the first speed or so that the gear 31 may engage the gear 34 to produce the third speed or so that both gears 30 and 31 may be held disengaged from the gears 33 and 34, and in like manner there is connected to the secondary wheel 16 by an eccentric pivot 35 a rod 36, having a pivotal connection 37 with further well-known variable-speed mechanism comprising the longitudinally-movable rod 38 with the arm 39 for moving the gears 40 and 41 along the driving-shaft 32, so that the gear 40 may be brought into engagement with the gear 43 to produce the second speed or so that the gear 41 may be brought into engagement with the gear 44 to produce the fourth speed or so that both gears 40 and 41 may be held disengaged from the gears 43 and 44.

The primary segmental wheel 7 is normally held in fixed position by a lock comprising a bolt 45, which reciprocates in bearings 46 and is adapted to enter the openings 14 between the projections 13. A spring latch or brake 47 is adapted to engage the openings 14, and a pawl 48 is adapted to engage the catch 12, both latch and pawl being fixed to the frame and by their engagements with the primary wheel serving to control the same in operation, as hereinafter described.

The foot-lever 49, fixed to a shaft 50, which is journaled in bearings 51, has an arm 52, having a pivotal connection 53 with the bolt 45, by which the latter is reciprocated. This foot-lever has the usual arm 54, connected with the crank 55, for disengaging the driving-shaft clutch 56 from the motor. It will be seen that when the driving-clutch is engaged the bolt connected therewith will lock the primary wheel and the mechanism controlled thereby.

The foot-lever 60 is loosely mounted on the shaft 50 and is provided with a lug or lugs 61, which engage with a stop or pin 62 of the shaft. The foot-lever arm 63 is connected with and operates the usual brake-rod 64, the operation of the foot-lever and the brake connected therewith simultaneously operating the clutch. Hence when the brake-foot lever is depressed the clutch is freed, as is also the primary wheel, and the brake is applied.

The reversing mechanism employs the usual lever 70, fulcrumed at 71 and held by the rack 72, the lever being pivoted to the rod 73, which effects the engagement of the gear-wheels 74 with the gear-wheels 30 and 31 in a well-known manner for reversing—that is to say, the rod 73 carries a pin 73', which lies in a slot 73" of the reciprocating cam 74", the cam being connected with and adapted to rock the crank-lever 74', which carries the reverse-gear 74, and hence the reciprocation of the rod 73 throws the reverse-gear into and out of engagement. To effect the interlocking of the reverse and the advance gearing to the lever 70, there is connected by a pivot 75 a link 76, having a pivotal connection 77 with a lock comprising the arm 78 and a rocking latch 79, which is pivoted at the points 80 to fixed bearings 81. The latch 79 is provided with the notches 82 and 83, with which the rods 26 and 36 must register in order that the reversing-gear may be engaged, for the reversing-lever 70 cannot be thrown unless the latch is permitted to rise by such registration, as otherwise the rods hold the latch down. When the rods 26 and 36 register with the notches 82 and 83, by elevating the latch 79 the projections 26' and 36' on the respective rods are engaged, the rods and the gears operated thereby thus being locked.

A dust-proof casing 85 incloses the segmental wheels and their immediate connections, the openings required for the operation of the movable parts, as the rod 36, being protected by a cover 86, movable in guides 87 as required by the oscillations of the rod passing therethrough.

In operation, with the mechanism in the position illustrated in Fig. 1, the bolt 45, by engagement with an aperture between the projections 13, locks the primary segmental wheel 7, which in turn locks the secondary segmental wheels 15 and 16 through the engagement of the convex blank segment 10 with the respective concave blank segments 20 and 23. The secondary wheels are thus locked in such position that they fix the advancing gears out of engagement, the same sliding on the rod 32, being revolubly held by the spline 32'. When the advancing gears are out of engagement, as shown, the shifting-rods 26 and 36 are held in position such as to permit the reverse-lever 70 to throw the reverse-gear into engagement and the latch 79 to engage the stops 26' and 36', thus preventing any change of gearing while the reverse is engaged. When the reverse is disengaged, the advance gearing may be engaged by depressing either foot-lever 49 or 60, thereby withdrawing the bolt 45, and then turning the shaft 2 and the primary segmental wheel 7 operated thereby. If this wheel be turned to the left, its gear-segment 8 engages the gear-segment 17 of the secondary segmental wheel 15, which is thereby revolved until the gear-wheel 30 engages the gear-wheel 33 for the first speed, the primary wheel being held at the desired position by the reëngagement of the bolt 45 with the primary wheel, which has been checked at the desired point by the brake 47 engaging with the projections 13. This revolution of the primary wheel has not moved the secondary wheel 16, since the blank segment 10 still engages the blank segment 23, thus holding this secondary wheel and the gearing connected therewith. If the primary wheel be turned to the left until it is checked by the engagement of the catch 12 with the pawl 48, the blank segment 10 still continues to engage the blank segment 23, while the blank segment 11 has been brought into engagement with the blank segment 19, all speeds being disengaged as at the initial position. With the mechanism in the position illustrated in Fig. 1 if the wheel 7 be turned to the right its gear-segment 9 engages the gear-segment 22 and turns the wheel 16, so that it throws the gear-wheel 40 into engagement with the gear-wheel 43 for producing the second speed. If the revolution of the wheel 7 be continued to the right until its blank segment 11 engages the blank segment 24, the second-speed gears 40 and 43 are disengaged, while the blank 10 still engages the blank 20 of the wheel 15, thus holding the first-speed gears disengaged when the second-speed gears are engaged. If after throwing the second-speed gears out of engagement the revolution of the wheel 7 be continued to the right, its gear-segment 9 engages the gear-segment 18 of the wheel 15, thus throwing the gear-wheel 31 into mesh with the gear-wheel 34, which produces the third speed. By continuing the revolution of the wheel 7 to the right its blank 11 is brought into engagement with the blank 19 of the wheel 15, and the third-speed gears are thus held disengaged while the blank 11 still engages the blank 24 of the wheel 16. By continuing to the right the revolution of the wheel 7 its gear-segment 8 is brought into mesh with the gear-segment 21 of the wheel 16, thus throwing the gear-wheel 41 into engagement with the gear-wheel 44, which produces the fourth speed, and by continuing the revolution to the right the gears for producing the fourth speed are disengaged and the gears for producing the first speed are brought into mesh.

From the foregoing description it will be seen that it is impossible to change the speed without first releasing the driving-clutch, that it is impossible to change the speed when the reverse is in, that it is possible to reverse only when all speeds are in free position, and to produce by the reverse only the first speed. It will further appear that the consecutive increasing and decreasing speeds may be obtained and that change may be made directly from the highest to the lowest, but not from the lowest to the highest. All parts are capable of assemblage in compact relation on a single plate or frame within the ready control of the operator.

Having thus described our invention, we claim—

1. In a mechanical movement, a revoluble primary wheel having a plurality of gear-segments and a plurality of blank segments, in combination with a plurality of revoluble secondary wheels each having a plurality of gear-segments and a plurality of blank segments, said primary wheel during its revolution alternately rotating and locking each of said secondary wheels, substantially as specified.

2. In a mechanical movement, a revoluble primary wheel having a plurality of gear-segments and a plurality of blank segments, a pair of revoluble secondary wheels each having one or more gear-segments and one or more blank segments, mechanism connected with and operated by each of said secondary wheels, said primary wheel moving each of said secondary wheels and the mechanism connected therewith while locking the other of said secondary wheels and the mechanism connected therewith, substantially as specified.

3. In a mechanical movement, a revoluble primary wheel, a revoluble secondary wheel in engagement therewith, said primary wheel during its revolution alternately rotating and locking said secondary wheel, mechanism connected with and operated by said secondary wheel, and a latch adapted to coact with and lock said mechanism, substantially as specified.

4. In a mechanical movement, a revoluble primary wheel, a revoluble secondary wheel in engagement therewith, said primary wheel during its revolution alternately rotating and locking said secondary wheel, and a bolt coacting with mechanism of said primary wheel for locking the same, substantially as specified.

5. In a mechanical movement, a revoluble primary wheel, a revoluble secondary wheel in engagement therewith, said primary wheel during its revolution alternately rotating and locking said secondary wheel, a rod connected with and reciprocated by said secondary wheel, and a latch for engaging and holding said rod, substantially as specified.

6. In a mechanical movement, a revoluble primary wheel, a pair of revoluble secondary wheels, said primary wheel locking each of said secondary wheels while rotating the other, and power-transmitting mechanism connected with and controlled by each of said secondary wheels, substantially as specified.

7. In a mechanical movement, a revoluble primary wheel, a plurality of revoluble secondary wheels, said primary wheel locking each of said secondary wheels while rotating another thereof, and a set of gears connected with and controlled by each of said secondary wheels, said mechanism preventing the engagement of more than one set of said gears at the same time, substantially as specified.

8. In a mechanical movement, a revoluble primary wheel, a plurality of revoluble secondary wheels, said primary wheel locking each of said secondary wheels while rotating another thereof, a set of gears connected with and controlled by each of said secondary wheels, and a latch for locking one or more of said secondary wheels and the gearing connected therewith, substantially as specified.

9. In a mechanical movement, a revoluble primary wheel, a revoluble secondary wheel in engagement therewith, a set of gears connected with and controlled by said secondary wheel, in combination with a reverse-gear and mechanism coacting therewith for holding said secondary wheel and the gears controlled thereby, substantially as specified.

10. In a mechanical movement, a revoluble shaft, a clutch for engaging and revolving said shaft, a gear wheel or wheels revolubly fixed and longitudinally movable upon said shaft, a second revoluble shaft and a gear wheel or wheels fixed thereon, mechanism for engaging and disengaging the gearing of said first shaft with the gearing of said second shaft, and a device coacting with said clutch for preventing said first gear or gears from being thrown while said clutch is engaged, substantially as specified.

11. In a mechanical movement, a driving-shaft, a gear wheel or wheels revolubly fixed and longitudinally movable upon said shaft, a driving-shaft and a gear wheel or wheels fixed thereon, a secondary wheel connected with and controlling the positions of said revolubly-fixed and longitudinally-movable gear wheel or wheels, a primary wheel connected with and controlling said secondary wheel, a clutch for operating said driving-shaft, and mechanism coacting with said clutch for locking said primary wheel during the engagement of said clutch, substantially as specified.

12. In a mechanical movement, a revoluble primary wheel, a pair of revoluble secondary wheels, variable-speed mechanism connected with and controlled by each of said secondary wheels, said primary wheel moving each of said secondary wheels and the mechanism connected therewith while locking the other of said secondary wheels and the mechanism connected therewith, and mechanism permitting the free revolution of said primary wheel in one direction and limiting its free revolution in the other direction, for the purpose specified, substantiallly as set forth.

13. In a mechanical movement, a plurality of sets of gears for producing different speeds, mechanism for controlling said sets of gears and preventing the engagement of more than one set at the same time, and mechanism for permitting a change directly from the highest to the lowest speed and preventing a change directly from the lowest to the highest speed, substantially as specified.

14. In a mechanical movement, a plurality of sets of gears for producing different speeds in the same direction, mechanism for controlling said sets of gears and preventing the engagement of more than one set at the same time, a reversing-gear, and mechanism for securing said first gears in free position before permitting the operation of said reverse-gear, substantially as specified.

15. In a mechanical movement, a plurality of sets of gears for producing different speeds, mechanism for controlling said sets of gears and preventing automatically the engagement of more than one set at the same time, a clutch and a shaft operated therefrom for rotating said gears, and mechanism preventing the engagement or disengagement of said gears while said clutch is engaged, substantially as specified.

16. In a mechanical movement, a set of forwardly-driving gears, a reciprocating rod connected therewith for shifting the same, a reverse-gear and a lever connected therewith for shifting the same, and a lock operated by said reverse-lever for engaging said rod and holding said forwardly-driving gears in fixed disengaged relation while said reverse-gear is engaged, substantially as specified.

17. In a mechanical movement, a revoluble shaft and one or more gear-wheels fixed thereon, a second revoluble shaft and one or more gear-wheels revolubly fixed but longitudinally movable thereon, a reciprocating rod connected with said second gear wheel or wheels for moving the same into and out of engagement with said first gear wheel or wheels, a reversing gear-wheel, a lever connected with said reversing gear-wheel for throwing the same into and out of engagement, and a lock operated by said lever, said lock engaging said rod and holding said reverse-gear out of engagement while said first and second named gear-wheels are in and holding said first and second named gear-wheels out of engagement while said reverse-gearing is in, substantially as specified.

18. In a mechanical movement, a driving-shaft, a clutch for operating the same, a revoluble wheel having segmental projections, a reciprocating bolt adapted to engage said segmental projections and lock said wheel, and mechanism connecting such clutch and bolt whereby said shaft and wheel are disengaged or engaged by said clutch and both at the same time, substantially as specified.

In testimony whereof we have hereunto set our hands this 27th day of November, 1900, in the presence of the subscribing witnesses.

DARWIN HANAUER.
THOMAS VEITCH.

Witnesses:
CHAS. W. MOFFETT,
C. B. FRAYER.